United States Patent
Suzuki

(10) Patent No.: US 9,681,061 B2
(45) Date of Patent: Jun. 13, 2017

(54) IMAGE-PROCESSING DEVICE AND IMAGE-PROCESSING METHOD

(71) Applicant: OLYMPUS CORPORATION, Hachioji-shi, Tokyo (JP)

(72) Inventor: Daisuke Suzuki, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/220,748

(22) Filed: Jul. 27, 2016

(65) Prior Publication Data
US 2016/0337571 A1 Nov. 17, 2016

Related U.S. Application Data

(63) Continuation of application No. PCT/JP2014/083119, filed on Dec. 15, 2014.

(51) Int. Cl.
*H04N 9/73* (2006.01)
*H04N 5/235* (2006.01)
*H04N 5/217* (2011.01)

(52) U.S. Cl.
CPC ................. *H04N 5/2357* (2013.01)

(58) Field of Classification Search
CPC ...... H04N 5/2357; H04N 5/357; H04N 5/217; G06K 9/40
(Continued)

(56) References Cited

U.S. PATENT DOCUMENTS

2008/0018751 A1* 1/2008 Kushida ................. H04N 5/235
348/226.1
2008/0225141 A1* 9/2008 Ogawa ................. H04N 5/3572
348/251
(Continued)

FOREIGN PATENT DOCUMENTS

JP 10093866 A 4/1998
JP 2009081684 A 4/2009
(Continued)

OTHER PUBLICATIONS

International Search Report (ISR) and Written Opinion dated Mar. 3, 2015 issued in International Application No. PCT/JP2014/083119.

*Primary Examiner* — Kelly L Jerabek
(74) *Attorney, Agent, or Firm* — Holtz, Holtz & Volek PC

(57) ABSTRACT

An image-processing device is provided with: a flicker detecting portion that detects a flicker component in an input image signal for each frame and that generates a first signal; a storing portion that stores the generated first signal for a plurality of latest continuous frames; a phase-displacement detecting portion that selects, from the stored past first flicker correction signals, the first signal having substantially the same phase as the most-recent first signal, and that detects a phase displacement level with respect to the most-recent first signal; a phase-displacement correcting portion that corrects the selected past first signal on the basis of the detected phase displacement level; an infinite-impulse-response combining portion that generates a second signal by combining, at a predetermined ratio, the corrected past first signal and the most-recent first signal; and a flicker correcting portion that corrects the input image signal on the basis of the generated second signal.

6 Claims, 8 Drawing Sheets

(58) Field of Classification Search
 USPC .......................... 348/226.1–228.1, 241, 246
 See application file for complete search history.

(56) References Cited

U.S. PATENT DOCUMENTS

| | | | |
|---|---|---|---|
| 2009/0051782 A1* | 2/2009 | Ono ........................ | H04N 5/235 348/226.1 |
| 2009/0167894 A1* | 7/2009 | Nakaoka ................ | H04N 5/235 348/226.1 |
| 2012/0002074 A1 | 1/2012 | Baba et al. | |

FOREIGN PATENT DOCUMENTS

| | | | |
|---|---|---|---|
| JP | 2011160090 A | 8/2011 | |
| JP | 2011259390 A | 12/2011 | |
| JP | 2012222739 A | 11/2012 | |
| JP | 2014027496 A | 2/2014 | |

* cited by examiner

IMAGE-PROCESSING DEVICE AND IMAGE-PROCESSING METHOD

CROSS-REFERENCE TO RELATED APPLICATIONS

This is a continuation of International Application PCT/JP2014/083119 which is hereby incorporated by reference herein in its entirety.

TECHNICAL FIELD

The present invention relates to an image-processing device and an image-processing method.

BACKGROUND ART

With image-acquisition devices that employ an image-acquisition element based on the X-Y address system, for example, a CMOS image sensor or the like, when video images are acquired under illumination, in which the brightness thereof changes in accordance with the power-supply frequency, such as under a fluorescent lamp, flicker occurs in the form of a lateral stripe pattern with dark portions and bright portions periodically appearing in the vertical direction of a frame image. Thus, there are various known methods of decreasing the flicker components occurring in the image in this way by applying image processing to the flicker components (for example, see Patent Literatures 1 to 3).

With the image-processing method described in Patent Literature 1, in an image-acquisition device in which an image-acquisition element thereof has different photocharge accumulation times for individual lines, output signal levels of individual pixels in 3n (n is a positive integer) continuous frames are divided by the average of the output signal levels of the individual pixels is these 3n continuous frames. Then, the gains by which the output signal levels the individual pixels in the 3n continuous frames are amplified are controlled so as to be proportional to the inverse of the divided values. By doing so, the flicker components generated due to electric discharge when using illumination light are decreased.

Alternatively, the total output signal levels of individual pixel groups, each of which is formed of a plurality of pixels in the 3n continuous frames, are divided by the average of the total output signal levels of the plurality of pixel groups in the 3n continuous frames, and the gains by which the output signal levels of the individual pixels in the 3n continuous frames are amplified are controlled so as to be proportional to the inverse of the divided values.

In addition, with regard to the image-processing method described in Patent Literature 2, in addition to the basic configuration described in Patent Literature 1, Patent Literature 2 describes a method of achieving temporal stability of the calculated flicker components by using an infinite-impulse-response low-pass filter and a method of controlling the cyclic coefficient of the infinite-impulse-response low-pass filter on the basis of information about the movement between frames. With the method of Patent Literature 1, large fluctuations occur in the calculated flicker components when large movements occur among the 3n continuous frames; however, with the method of Patent Literature 2, it is assumed that misdetection and over correction of the flicker components can be prevented by using an infinite-impulse-response low-pass filter that works in association with the movement information.

Furthermore, in Patent Literature 3, in addition to the basic configuration described in Patent Literature 1, it is assumed that, even in the case in which the acquired image shows extremely large movements among the 3n continuous frames or even in the case in which the phases of the flicker components change due to changes in the power-supply frequency or the image-acquisition frame rate, it is possible to achieve excellent suppression of flicker by applying, after appropriate adjustments, the phases of flicker components calculated by using past frames to current frames.

CITATION LIST

Patent Literature

{PTL 1} Japanese Unexamined Patent Application, Publication No. Hei 10-93866
{PTL 2} Japanese Unexamined Patent Application, Publication No. 2012-222739
{PTL 3} Japanese Unexamined Patent Application, Publication No. 2014-27496

SUMMARY OF INVENTION

Solution to Problem

An aspect of the present invention is an image-processing device including: a flicker detecting portion that detects a flicker component in an input image signal for each frame and that generates a first flicker correction signal; a flicker-correction-signal storing portion that stores the first flicker correction signal generated by the flicker detecting portion for a plurality of latest continuous frames; a phase-displacement detecting portion that, when the most-recent first flicker correction signal is detected by the flicker detecting portion, selects the past first flicker correction signal having substantially the same phase as the most-recent first flicker correction signal from the past first flicker correction signals stored in the flicker-correction-signal storing portion, and that detects a phase displacement level with respect to the most-recent first flicker correction signal; a phase-displacement correcting portion that corrects the phase displacement of the selected past first flicker correction signal on the basis of the phase displacement level detected by the phase-displacement detecting portion; an infinite-impulse-response correction-signal combining portion that generates a second flicker correction signal by combining, at a predetermined ratio, the past first flicker correction signal, in which the phase displacement thereof has been corrected by the phase-displacement correcting portion, and the most-recent first flicker correction signal; and a flicker correcting portion that corrects the input image signal on the basis of the second flicker correction signal generated by the correction-signal combining portion.

In addition, another aspect of the present invention is an image-processing method including: a flicker detecting step of detecting a flicker component in an input image signal for each frame and of generating a first flicker correction signal; a flicker-correction-signal storing step of storing the first flicker correction signal generated in the flicker detecting step for a plurality of latest continuous frames; a phase-displacement detecting step of, when the most-recent first flicker correction signal is detected in the flicker detecting step, selecting the past first flicker correction signal having substantially the same phase as the most-recent first flicker correction signal from the past first flicker correction signals stored in the flicker-correction-signal storing step, and of detecting a phase displacement level with respect to the most-recent first flicker correction signal; a phase-displacement correcting step of correcting the phase displacement of the selected past first flicker correction signal on the basis of the phase displacement level detected in the phase-displacement detecting step; a correction-signal combining step of generating a second flicker correction signal by combining, at a predetermined ratio, the past first flicker correction signal, in which the phase displacement thereof has been corrected in the phase-displacement correcting step, and the most-recent first flicker correction signal; and a flicker correcting step of correcting flicker in the input image signal on the basis of the second flicker correction signal generated in the correction-signal combining step.

DESCRIPTION OF EMBODIMENT

An image-processing device 1 and an image-processing method according to an embodiment of the present invention will be described below with reference to the drawings.

Figure 1:
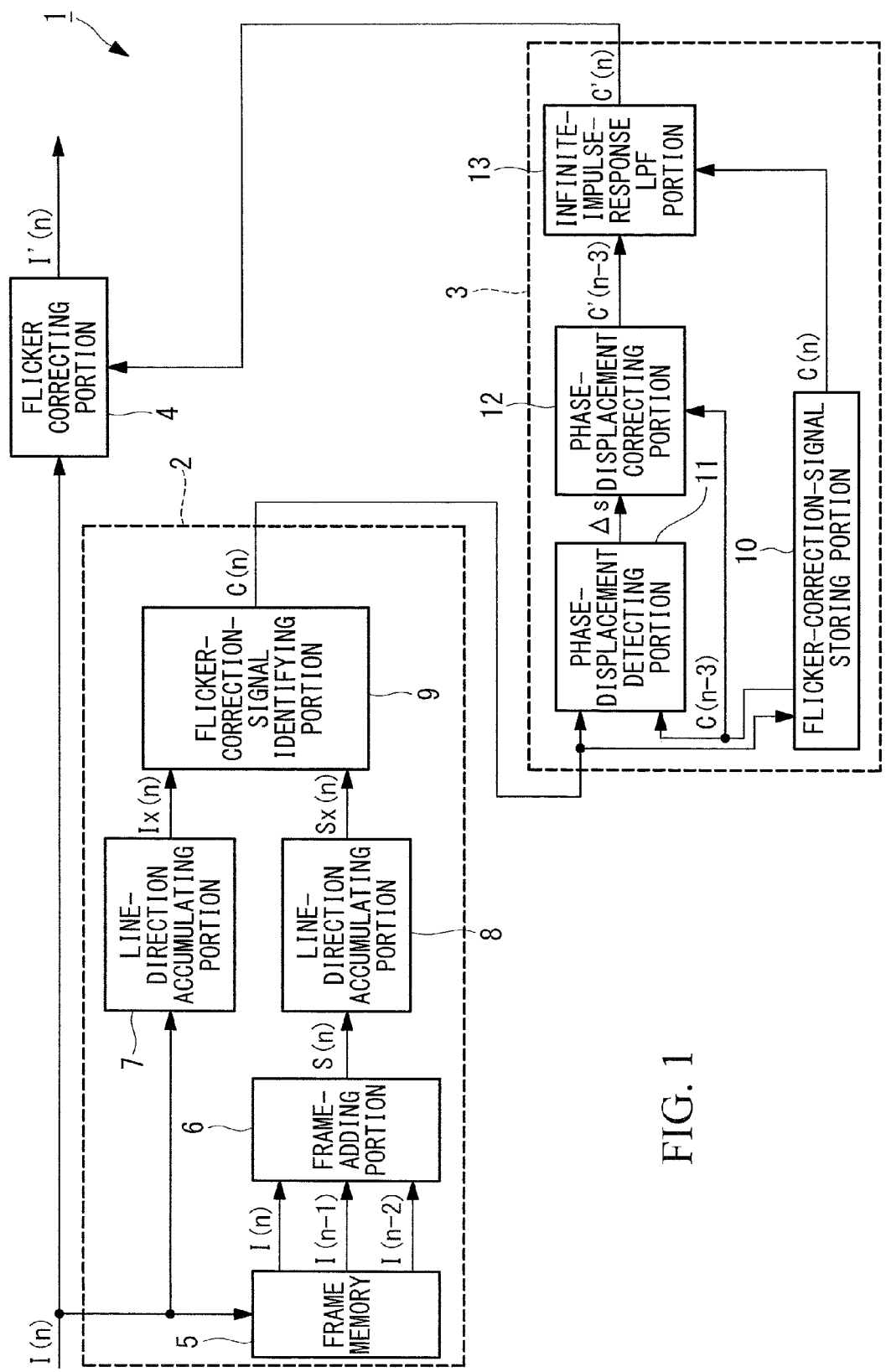
FIG. 1 is a block diagram showing an image-processing device according to an embodiment of the present invention.

As shown in FIG. 1, the image-processing device 1 according to this embodiment is provided with: a flicker detecting portion 2 that calculates first flicker correction signals on the basis of input image signals acquired by using a camera; a flicker-correction-signal reshaping portion 3 that generates second flicker correction signals by reshaping the first flicker correction signals detected by the flicker detecting portion 2; and a flicker Correcting portion 4 that corrects the input image signals by using the second flicker correction signals generated by the flicker-correction-signal reshaping portion 3.

In describing this embodiment, a case in which the illumination power-supply frequency is 50 Hz when capturing images by using a camera and the image-acquisition frame rate of the camera is 60 fps (frame/second) will be described.

The flicker detecting portion 2 is provided with a frame memory 5 that stores the input image signals transmitted thereto from the camera. The frame memory 5 is configured so as to store input image signals for three frames, namely, an input image signal I(n) of the most recent frame (hereinafter, referred to as "current frame") and input image signals I(n−1) and I(n−2) of two past frames (hereinafter, referred to as "Past frames") from the immediate past relative to the current frame.

In addition, the flicker detecting portion 2 is provided with a frame-adding portion 6 that sums the input image signals I(n−2), I(n−1), and I(n) of the three frames stored in the frame memory 5 to calculate the average thereof. The frame-adding portion 6 performs the following computation, and an average image signal S(n), resulting from summation and averaging, is output.

$$S(n)=(I(n)+I(n-1)+I(n-2))/3$$

Figure 2A:
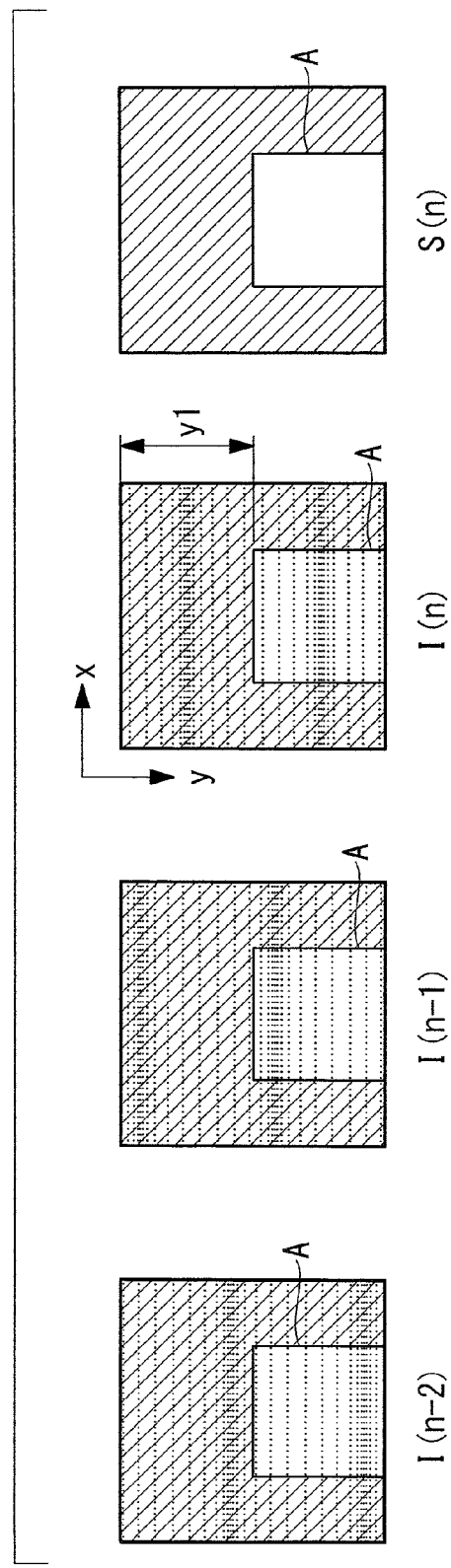
FIG. 2A is a diagram showing example images of three continuous frames and an example integrated image thereof for explaining the operation of a flicker detecting portion of the image-processing device in FIG. 1.

Here, the input image signals I(n−2), I(n−1), and I(n) and the image signal S(n), which has been calculated by summation and averaging, have the relationships as exemplified in FIG. 2A. In other words, in the input image signals I(n−2), I(n−1), and I(n), flicker stripes in which the phases thereof are displaced by $2\pi/3$ from each other occur. In addition, the flicker stripes are eliminated in the average image signal S(n) by means of summation and averaging, thus making the average image signal S(n) a stripe-free image signal. Because human vision generally does not have temporal resolution that exceeds 100 Hz, viewing with naked eyes results in recognition of an image close to the average image signal S(n).

In addition, the flicker detecting portion 2 is provided with: a line-direction accumulating portion 7 that accumulates the input image signals I(n) in the lateral direction (the direction along the lines) x at individual positions y of the input image signals I(n) in the longitudinal direction (arrayed direction of the lines), assuming that the upper left corner of the input image signals I(n) of the current frame is the origin; and a line-direction accumulating portion 8 that accumulates the average image signals S(n) in the lateral direction x at the individual positions y of the average image signals S(n) in the longitudinal direction, assuming that the upper left corner of the average image signals S(n) is the origin.

In the line-direction accumulating portions 7 and 8, the following computation is performed.

$$I_x(n)(y) = \sum_{i=0}^{width} I(n)(i, y) \qquad \{\text{Eq. 1}\}$$

$$S_x(n)(y) = \sum_{i=0}^{width} S(n)(i, y)$$

Here, the width indicates the horizontal size of the image signal.

Figure 2B:
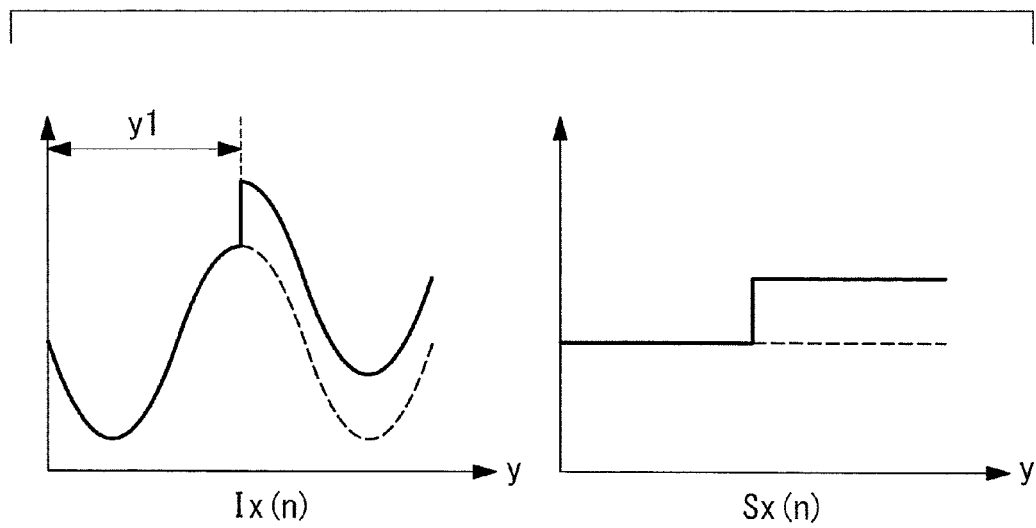
FIG. 2B, is a diagram showing line cumulative data for the most recent input image and the integrated image in FIG. 2A.
Figure 2C:
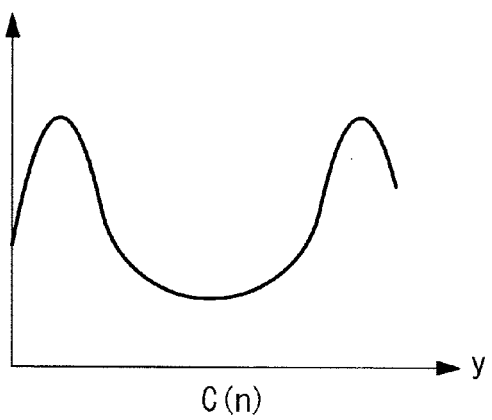
FIG. 2C is a diagram showing example flicker correction signals identified in the two images in FIG. 2B.

Cumulative values Ix(n) and Sx(n) calculated at the individual line-direction accumulating portions 7 and 8 have the relationship shown in FIG. 2B. Because the input image signals I(n−2), I(n−1), and I(n) and the average image signal S(n) shown as an example have, at a lower portion in the center of the image, a rectangular region A in which the luminance thereof is greater than that of the surrounding areas, both cumulative values are increased from the corresponding coordinate y1. In the figures, cumulative values for the case in which the rectangular region does not exist are indicated by the broken line.

In addition, the flicker detecting portion 2 is provided with a flicker-correction-signal identifying portion 9 that identifies first flicker correction signals C(n) from the cumulative values Ix(n) of the input image signals I(n) of the current frame and the cumulative values Sx(n) of the average image signals S(n), The flicker-correction-signal identifying portion 9 is configured so as to calculate the first flicker correction signals C(n) by means of the computation indicated by Eq. 2.

$$C(n) = \frac{S_x(n)}{I_x(n) + e} \quad \{\text{Eq. 2}\}$$

Here, e is a constant for preventing division by zero.

The first flicker correction signals C(n) are also one-dimensional data that correspond to the longitudinal direction (y-direction) and that have a waveform having characteristics such that flicker stripes of the input image signals I(n) of the current frame are eliminated, as shown in FIG. 20.

Next, the flicker-correction-signal reshaping portion 3 will be described.

The flicker-correction-signal reshaping portion 3 is provided with a flicker-correction-signal storing portion 10 that stores the first flicker correction signals detected by the flicker detecting portion 2 in the form of flicker correction signals C(n−3), C(n−2), and C(n−1) detected for three continuous frames in the immediate past, in addition to the first flicker correction signals C(n) detected for the current frame.

The flicker-correction-signal reshaping portion 3 is configured so as to discard the signals that have been stored as the first flicker correction signal C(n−3) for the frame preceded by three frames when the first flicker correction signals of the current frame are input, and so as to move down the first flicker correction signals C(n), C(n−1), and C(n−2) by one signal each, thus the first flicker correction signals C(n−1), C(n−2), and C(n−3) of the past frames.

Figure 3:
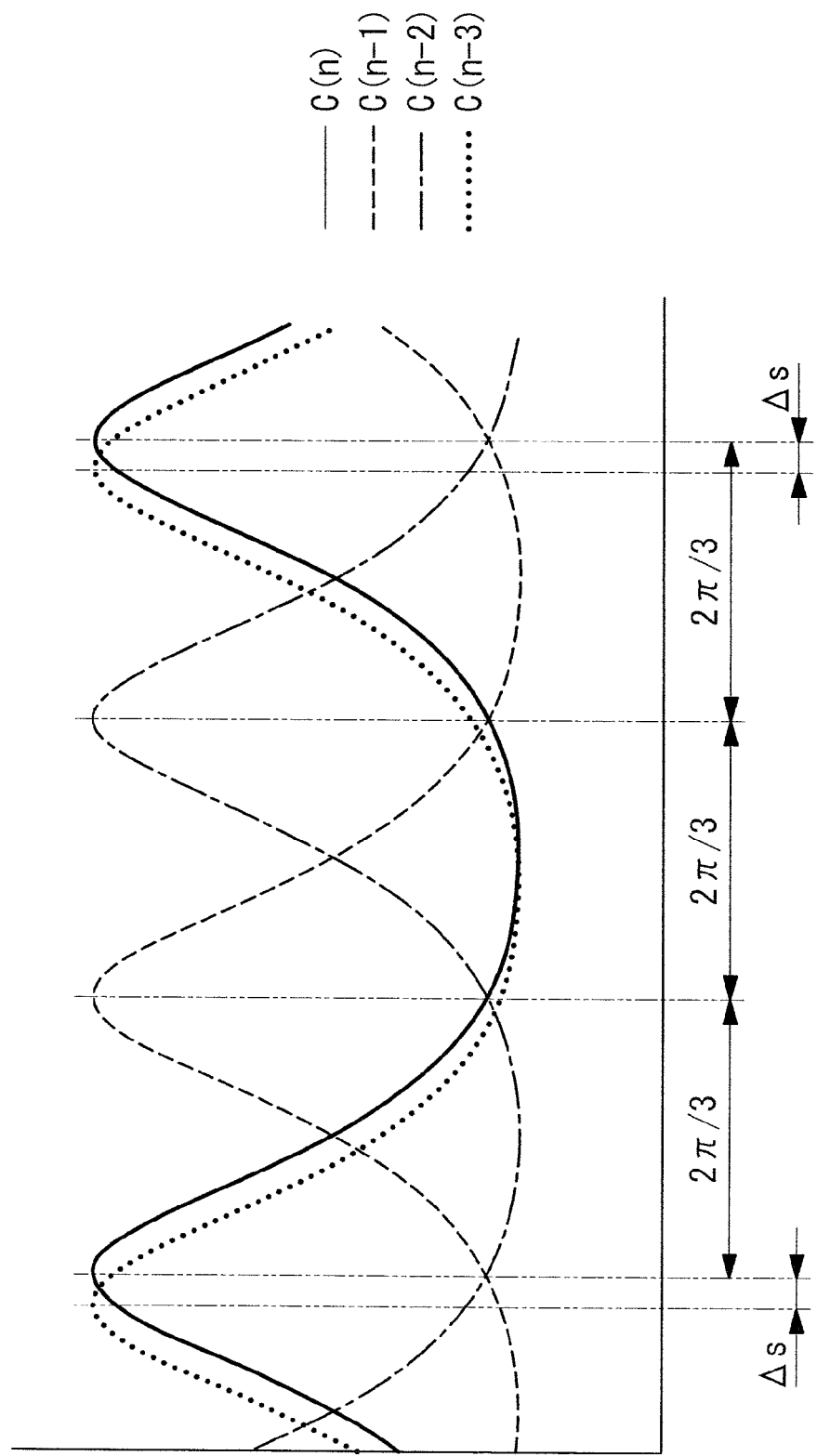
FIG. 3 is a diagram showing the phase relationships among flicker correction signals for a plurality of frames detected by a flicker-correction-signal storing portion of the image-processing device in FIG. 1.

As shown in FIG. 3, because the phases of flicker stripes originally contained in the input image signals I(n−2), I(n−1), and I(n) are normally displaced by 2π/3 each, the phases of the first flicker correction signals C(n−3), C(n−2), C(n−1), and C(n) are also displaced by 2n/3 each. Then, because three frames complete one cycle of the phase thereof, the phase of the first flicker correction signals C(n) of the current frame ideally matches the phase of the first flicker correction signals C(n−3) of the frame that is three frames earlier. However, a phase displacement Δs occurs when there is an error in the image-acquisition frame rate.

The flicker-correction-signal reshaping portion 3 is provided with a phase-displacement detecting portion 11 that receives, as inputs, the first flicker correction signals C(n) of the current frame, output from the flicker detecting portion 2, and the first flicker correction signals C(n−3) of the frame that is three frames earlier, stored in the flicker-correction-signal storing portion 10, and that detects the phase displacement level Δs between these two first flicker correction signals C(n) and C(n−3).

The phase-displacement detecting portion 11 detects the phase difference is between the first flicker correction signal C(n) of the current frame and the first flicker correction signal C(n−3) detected three frames earlier by means of one-dimensional pattern matching. The one-dimensional sum of absolute difference (SAD) indicated by Eq. 3 is used as the matching evaluation value.

$$SAD(s) = \sum_{i=smax}^{height-smax-1} |C(n)(i) - C(n-3)(i+s)| \quad \{\text{Eq. 3}\}$$

Here, the height is the vertical size of the input image signal, and smax is a phase displacement level that is appropriately changed in accordance with the magnitude of a presumed error in the image-acquisition frame rate. For example, in the case in which it is presumed that a phase displacement of a maximum smax occurs between C(n) and C(n−3) due to an error in the image-acquisition frame rate, the SAD(s) is calculated within the following range:

−smax≤Δs≤smax.

The SAD(s) indicates the sum of absolute differences with respect to the first flicker correction signal C(n) of the current frame when the first flicker correction signal C(n−3) of the frame that is three frames earlier is displaced by the phase displacement level Δs, and the minimum value thereof is achieved at a Δs for which the difference between the two first flicker correction signals C(n) and C(n−3) is minimized. In other words, the phase displacement level Δs is determined by the following expression.

Δs=argminSAD(s)

In addition, the flicker-correction-signal reshaping portion 3 is provided with a phase-displacement correcting portion 12 that generates a displaced first flicker correction signal C'(n−3) in which the phase of the first flicker correction signal C(n−3) of the frame that is three frames earl r is displaced by the phase displacement level Δs by using the phase displacement level Δs detected by the phase-displacement detecting portion 11.

In addition, the flicker-correction-signal reshaping portion 3 is provided with a correction-signal combining portion that receives, as inputs, the displaced first flicker correction signal C'(n−3) generated by the phase-displacement correcting portion 12 and the first flicker correction signal C(n) of the current frame, and that combines the two signals at a predetermined combining ratio in accordance with the expression below, thus generating a second flicker correction signal C'(n). The correction-signal combining portion is formed of an infinite-impulse-response low-pass filter (infinite-impulse-response LPF) 13.

C'(n)=αC'(n−3)+(1−α)C(n)

Here, α is the feedback coefficient, which is defined within a range 0≤α<1, and, by setting a to an appropriate value, the temporal stability of the second flicker correction signal C'(n) can be increased. For example, it is preferable that a be set to 0.8.

In this way, the flicker-correction-signal reshaping portion 3 outputs the second flicker correction signal C'(n).

The flicker correcting portion 4 is configured so as to correct the input image signal I(n) by multiplying the input image signal I(n) of the current frame by the second flicker correction signal C' output from the flicker-correction-signal reshaping portion 3. In addition, I'(n) in the figure is the image signal corrected by the flicker correcting portion 4.

The image-processing method in which the thus-configured image-processing device 1 according to this embodiment is used will be described below.

Figure 4:
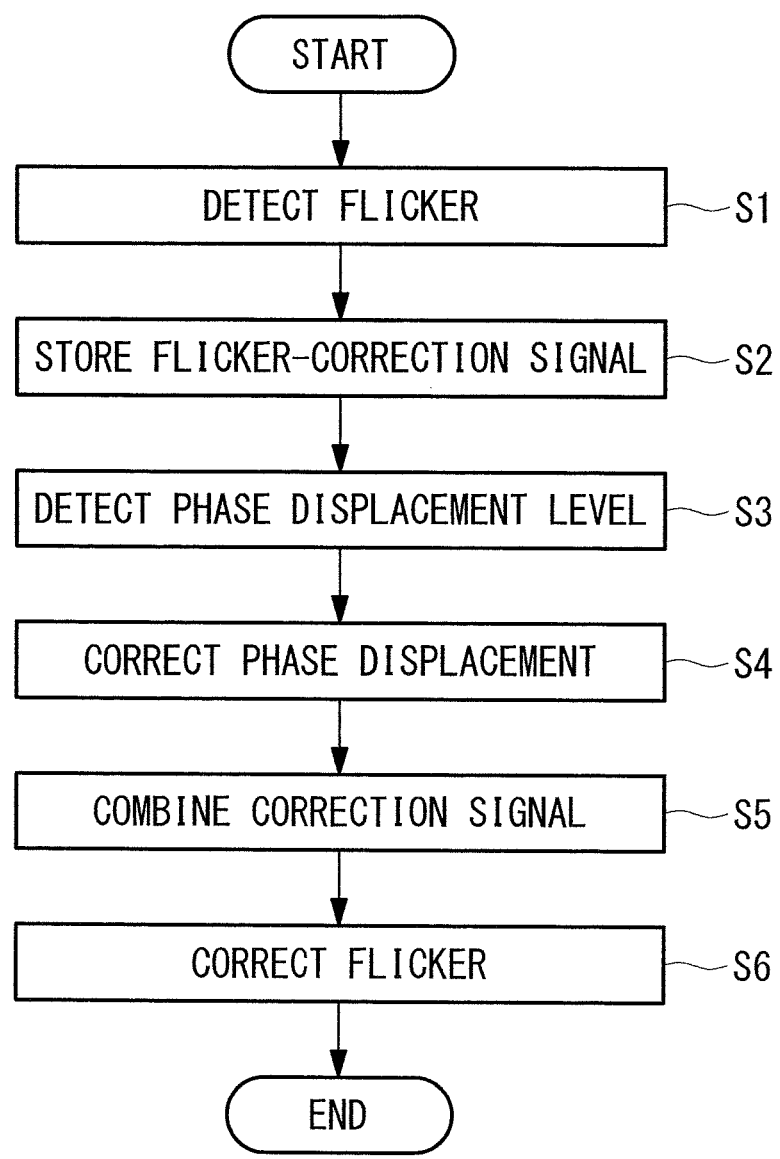
FIG. 4 is a flowchart for explaining an image-processing method in which the image-processing device in FIG. 1 is employed.

As shown in FIG. 4, with the image-processing method according to this embodiment, first, the flicker detecting portion 2 detects flicker components from the input image signal I(n) for each frame and generates the first flicker correction signals (flicker detecting step S1)

Next, the first flicker correction signals generated in the flicker detecting step S1 for the latest four continuous frames, including the current frame, are stored in the flicker-correction-signal storing portion 10 (flicker-correction-signal storing step S2).

In this state, among the first flicker correction signals C(n−1), C(n−2), and C(n−3) of the past frames stored in the flicker-correction-signal storing portion 10, the phase-displacement detecting portion 11 selects the first flicker correction signal C(n−3) of the frame that is three frames earlier and detects the phase displacement level with respect to the first flicker correction signal C(n) of the current frame (phase-displacement detecting step S3). The phase displacement level is detected by means of, for example, pattern matching.

Then, on the basis of the phase displacement level detected in the phase-displacement detecting step S3, the phase-displacement correcting portion 12 corrects the phase displace the selected first flicker correction signal C(n−3) for the frame that is three frames earlier (phase-displacement correcting step S4).

By combining the first flicker correction signal C(n−3) for the frame that is three frames earlier, in which the phase displacement thereof has been corrected, and the first flicker correction signal C(n) of the current frame at a predetermined ratio, the second flicker correction signal C' (n) is generated (correction-signal combining step S5).

Finally, the input image signal I(n) is corrected (flicker correcting step S6) on the basis of the second flicker correction signal C'(n) generated in the correction-signal combining step S5, As has been described, with the image-processing device 1 and the image-processing method according to this embodiment, even if minute phase displacements occur in the first flicker correction signals C(n), C(n−1), C(n−2), and C(n−3) of each frame due to an error in the image-acquisition frame rate or the like, these signals are input, in the corrected state, to the infinite-impulse-response low-pass filter 13, Thus, because the infinite-impulse-response low-pass filter 13 is used to generate the second flicker correction signal C'(n) in, which the first flicker correction signal C(n) of the current frame and the first flicker correction signal C(n−3) for the frame that is three frames earlier are combined at the predetermined ratio, there is an advantage in that it is possible to generate the second flicker correction signal. C'(n) having temporal stability and, by using this, it is possible to effectively remove flicker contained in the input image signal I(n) of the current frame.

In addition, because the phase displacement level between the two first flicker correction signals C(n) and C(n−3) is detected by means of pattern matching in the phase-displacement detecting step S3, there is an advantage in that it is not necessary to perform relatively high-cost processing such as a DFT or the like, and it is possible to detect, in a simple manner, the phase displacement levels of the first flicker correction signals C(n−1), C(n−2), and C(n−3) of the past frames.

Note that, because the case in which the power-supply frequency is 50 Hz and the image-acquisition frame rate is 60 fps has been described as an example in this embodiment, the phase displacement level between the first flicker correction signal C(n) of the current frame and the first flicker correction signal C(n−3) for the frame that is three frames earlier is detected; however, in the case in which the power-supply frequency and/or the image-acquisition frame rate differ, the past frame for which the phase displacement level is to be detected may be selected by setting the number of first flicker correction signals to be stored by the flicker-correction-signal storing portion 10 on the basis of a cycle determined in accordance with the power-supply frequency and/or the image-acquisition frame rate.

In addition, in this embodiment, the phase-displacement correcting portion 12 displaces, by the phase displacement level Δs, the phase of the first flicker correction signal C(n−3) for the frame that is three frames earlier by using the phase displacement level Δs detected by the phase-displacement detecting portion 11; alternatively, however, because only simple displacement is involved, the function of the phase-displacement correcting portion 12 may be executed by means of displacement performed during addressing of the infinite-impulse-response low-pass filter 13.

Figure 5:
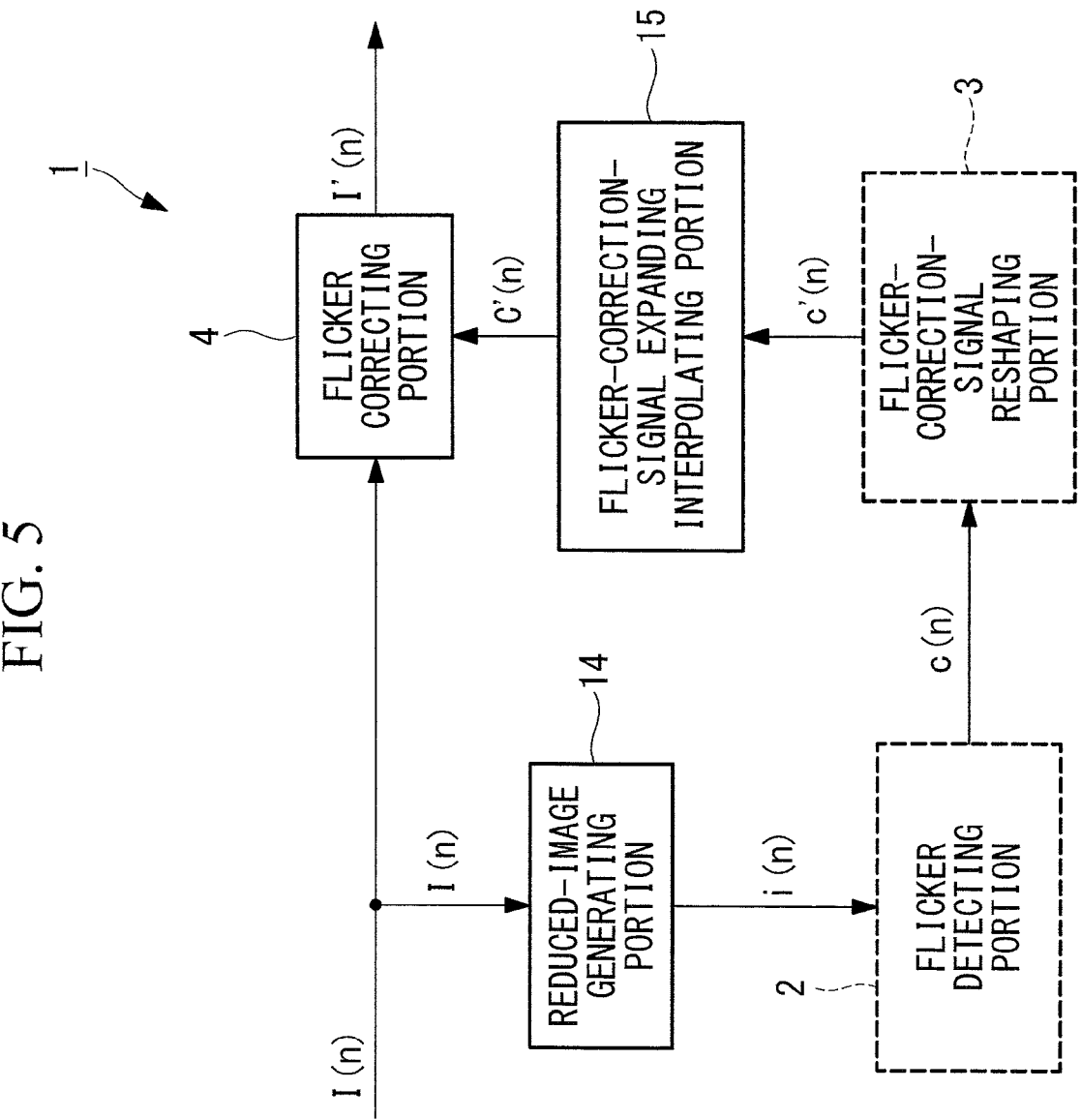
FIG. 5 is a block diagram showing a modification of the image-processing device in FIG. 1.

In addition, in this embodiment, the input image signal I(n) acquired by the camera is input to the flicker detecting portion 2 in the original size; alternatively, however, as shown in FIG. 5, a reduced-image generating portion 14 that reduces the size of the input image signal I(n) acquired by the camera and a flicker-correction-signal expanding interpolating portion (correction-signal expanding portion) that expands the second flicker correction signal c'(n) output from the flicker-correction-signal reshaping portion 3 may be provided. In addition, in FIG. 5, i(n) is a signal in which the size of the image signal I(n) is reduced, and C'(n) is a signal in which the second flicker correction signal c'(n) is expanded.

The reduction ratio used by the reduced-image generating portion 14 is arbitrary. Because general flicker components do not contain high-frequency components, it is possible achieve a satisfactory flicker-correction effect by having about 30 to 50 pixels in the vertical direction, in other words, by having about 30 to 50 sampling points for the flicker correction signals. Thus, for example, in the case of a full-HD standard input image signal, the preferable reduction ratios are about 1/20 to 1/30 in the vertical and horizontal directions, respectively.

By performing such an image reduction, there is an advantage in that it is possible to considerably decrease the memory capacities required for the frame memory 5 in the flicker detecting portion 2 and the flicker-correction-signal storing portion 10 in the flicker-correction-signal reshaping portion 3 and that it is also possible to considerably decrease the amount of computation to be performed in each block.

The first-flicker-correction-signal generating processing in the flicker detecting portion 2 in this case is the same as that in the above-described embodiment.

Figure 6:
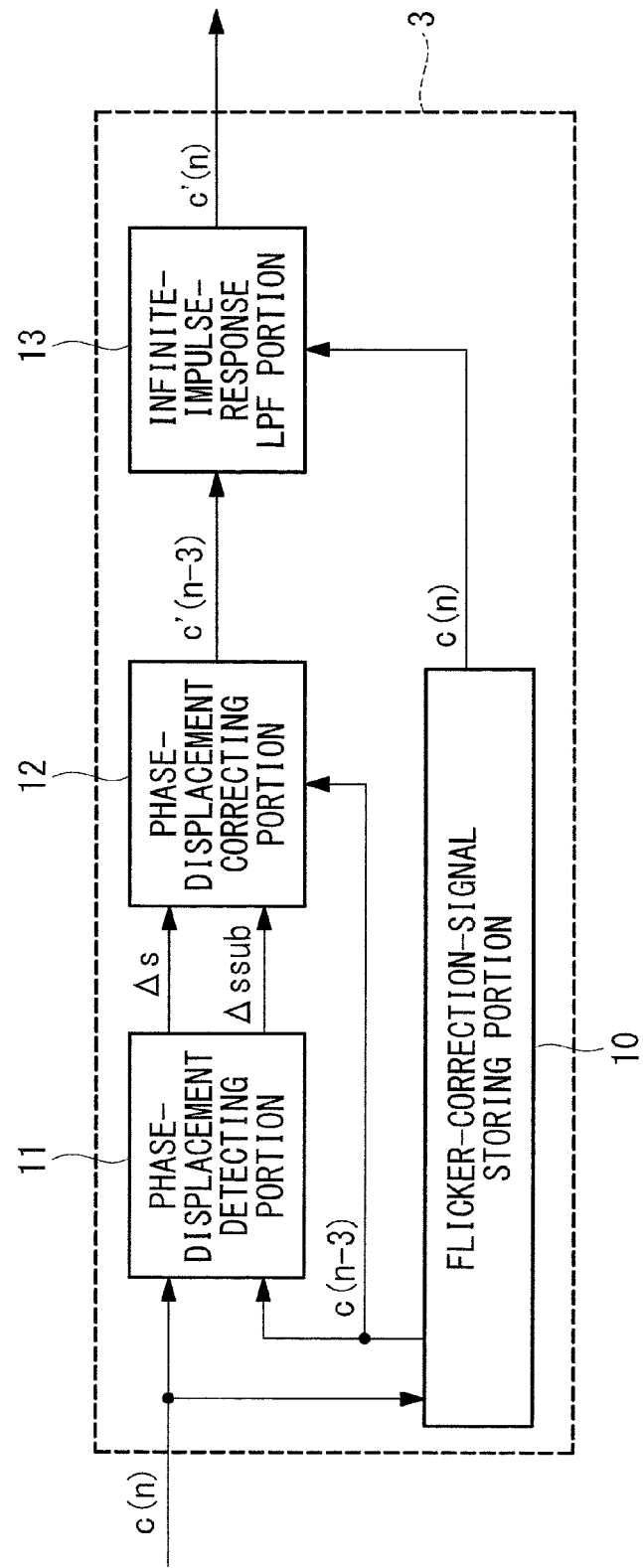
FIG. 6 is a block diagram showing a flicker-correction-signal reshaping portion of the image-processing device in FIG. 5.

As shown in FIG. 6, the flicker-correction-signal reshaping portion 3 is configured so that the phase-displacement detecting portion 11 calculates not only the phase displacement level Δs having the integer unit but also a phase displacement level Δssub having the decimal unit. By doing so, it is possible to ensure detection of the phase displacement level with satisfactory precision even with a reduced image in which the number of samples in the vertical direction is considerably decreased.

The phase displacement level Δssub having the decimal unit can be calculated by means of Eq. 4 by using the SAD(s) and the phase displacement level Δs, described above.

$$\Delta ssub = \begin{cases} \dfrac{SAD(\Delta s-1) - SAD(\Delta s+1)}{2(SAD(\Delta s-1) - SAD(\Delta s))} & \ldots SAD(\Delta s-1) > SAD(\Delta s+1) \\ \dfrac{SAD(\Delta s+1) - SAD(\Delta s-1)}{2(SAD(\Delta s+1) - SAD(\Delta s))} & \ldots SAD(\Delta s-1) < SAD(\Delta s+1) \\ 0 & \ldots SAD(\Delta s-1) = SAD(\Delta s+1) \end{cases} \quad \{\text{Eq. 4}\}$$

Figure 7:
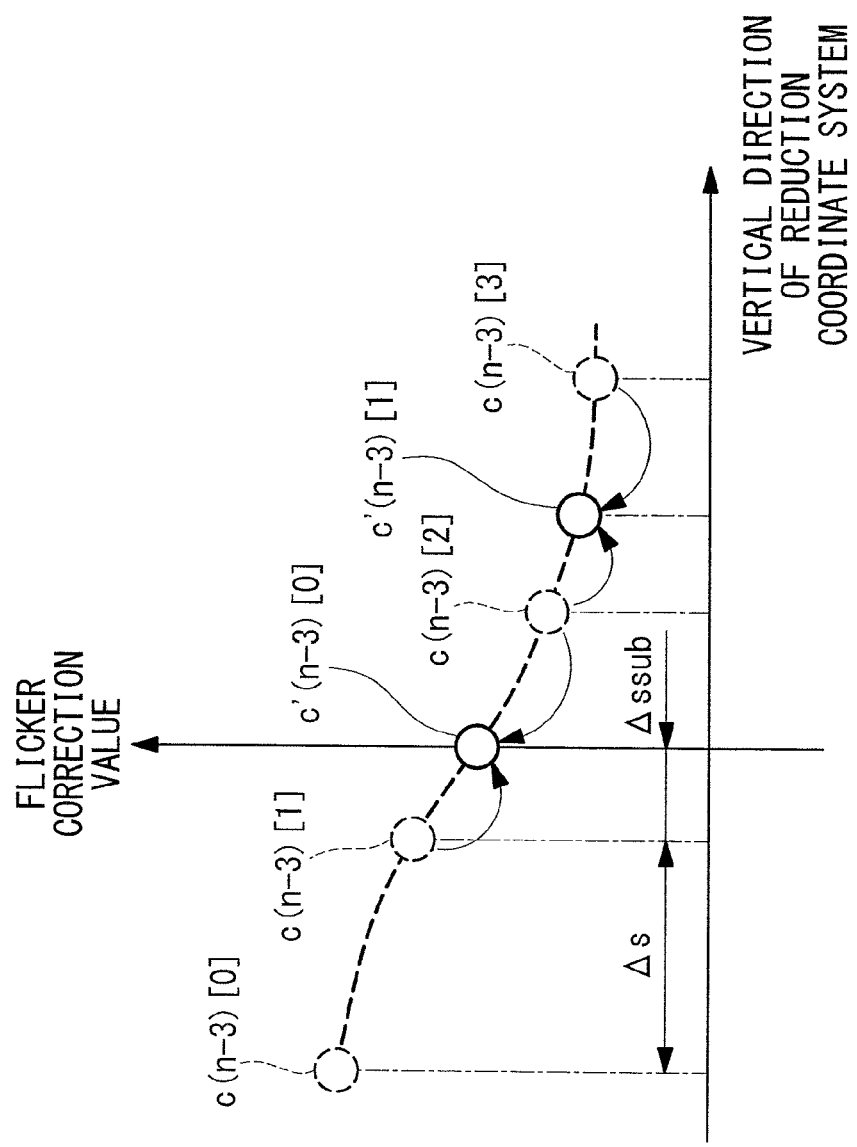
FIG. 7 is a diagram for explaining interpolation performed by means of the flicker-correction-signal reshaping portion in FIG. 6.

The phase-displacement correcting portion 12 calculates the displaced first flicker correction signal c'(n−3) in which, by using the phase displacement levels Δs and Δssub calculated by the phase-displacement detecting portion 11, the phase of the first flicker correction signal c(n−3) for the frame that is three frames earlier is displaced by Δs+Δssub. As shown in FIG. 7, this computation can be executed by means of the nearest neighbor interpolation.

By using the displaced first flicker correction signal c'(n−3) calculated in this way and the first flicker correction signal c(n) of the current frame, the infinite-impulse-response low-pass filter 13 calculates the second flicker correction signal c'(n) of the current frame in the reduction coordinate system.

Then, the calculated second flicker correction signal c'(n) is input to the flicker correcting portion 4 in the state in which the calculated second flicker correction signal c' (n) has been restored to fit the original coordinate system by being expanded by the flicker-correction-signal expanding interpolating portion 15, and is used in multiplication, in a line-by-line manner, with the input image signal of the current frame in the original coordinate system, thus making it possible to suppress the flicker components.

The above-described embodiment leads to the following inventions.

An aspect of the present invention is an image-processing device including: a flicker detecting portion that detects a flicker component in an input image signal for each frame and that generates a first flicker correction signal; a flicker-correction-signal storing portion that stores the first flicker correction signal generated by the flicker detecting portion for a plurality of latest continuous frames; a phase-displacement detecting portion that, when the most-recent first flicker correction signal is detected by the flicker detecting portion, selects the past first flicker correction signal having substantially the same phase as the most-recent first flicker correction signal from the past first flicker correction signals stored in the flicker-correction-signal storing portion, and that detects a phase displacement level with respect to the most-recent first flicker correction signal; a phase-displacement correcting portion that corrects the phase displacement of the selected past first flicker correction signal on the basis of the phase displacement level detected by the phase-displacement detecting portion; an infinite-impulse-response correction-signal combining portion that generates a second flicker correction signal by combining, at a predetermined ratio, the past first flicker correction signal, in which the phase displacement thereof has been corrected by the phase-displacement correcting portion, and the most-recent first flicker correction signal; and a flicker correcting portion that corrects the input image signal on the basis of the second flicker correction signal generated by the correction-signal combining portion.

With this aspect, the first flicker correction signals generated on the basis of the flicker components detected by the flicker detecting portions are stored by the flicker-correction-signal storing portion for a plurality of frames, the phase-displacement detecting portion selects the past first flicker correction signal having substantially the same phase as the most-recent first flicker correction signal, and the phase displacement level between the two first flicker correction signals is detected. After the phase-displacement correcting portion corrects, on the basis of the detected phase displacement level, the phase displacement of the past first flicker correction signal selected by the phase-displacement detecting portion, the infinite-impulse-response correction-signal combining portion combines the two first flicker correction signals at the predetermined, ratio, thus generating the second flicker correction signal. Then, the flicker correcting portion corrects the input image signal by using the generated second flicker correction signal, and thus, flicker is removed.

In other words, when correcting flicker in the case in which there are errors in the image-acquisition frame rate, by correcting, in advance, the phase displacement of the first flicker correction signal that has been calculated in the past, it is possible to prevent precision deterioration in the second flicker correction signal generated by the infinite-impulse-response correction-signal combining portion, thus making it possible to remove flicker in the input image signal in a precise manner.

In the above-described aspect, the phase-displacement detecting portion may select the past first flicker correction signal for a number of frames that matches a flicker occurrence cycle determined on the basis of a power-supply frequency in the surrounding environment when acquiring the input image signal and an image-acquisition frame rate at which the input image signal is acquired.

By doing so, it is possible to select the first flicker correction signal of the past frame having the closest phase in a simple manner. For example, in the case in which the power-supply frequency is 50 Hz and the image-acquisition frame rate is 60 fps, because the phase of the first flicker correction signal of the frame that is three frames earlier is substantially the same as the phase of the most-recent first flicker correction signal, the phase-displacement detecting portion selects the first flicker correction signal of the frame that is three frames earlier, and the phase displacement level is detected.

In addition, the above-described aspect may be provided with a reduced-image generating portion that inputs the input image signal to the flicker detecting portion after reducing the input image signal by a predetermined ratio; and a correction-signal expanding portion that inputs the second flicker correction signal to the flicker correcting portion after expanding the second flicker correction signal by the predetermined ratio.

By doing so, it is possible to perform real-time flicker correction by considerably reducing the amount of computation in the processes of calculating the first flicker correction signal and the second flicker correction signal.

In addition, in the above-described aspect, the phase-displacement detecting portion may detect a phase displacement by subjecting the two first flicker correction signals to pattern matching.

By doing so, it is possible to detect, in a simple manner, the phase displacement level with respect to the first flicker correction signal detected by using past frames, without having to perform a relatively high-cost processing, such as a DFT (discrete Fourier transformation) or the like.

In addition, another aspect of the present invention is an image-processing method including: a flicker detecting step of detecting a flicker component in an input image signal for each frame and of generating a first flicker correction signal;

a flicker-correction-signal storing step of storing the first flicker correction signal generated in the flicker detecting step for a plurality of latest continuous frames; a phase-displacement detecting step of, when the most-recent first flicker correction signal is detected in the flicker detecting step, selecting the past first flicker correction signal having substantially the same phase as the most-recent first flicker correction signal from the past first flicker correction signals stored in the flicker-correction-signal storing step, and of detecting a phase displacement level with respect to the most-recent first flicker correction signal; a phase-displacement correcting step of correcting the phase displacement of the selected past first flicker correction signal on the basis of the phase displacement level detected in the phase-displacement detecting step; a correction-signal combining step of generating a second flicker correction signal by combining, at a predetermined ratio, the past first flicker correction signal, in which the phase displacement thereof has been corrected in the phase-displacement correcting step, and the most-recent first flicker correction signal; and a flicker correcting step of correcting flicker in the input image signal on the basis of the second flicker correction signal generated in the correction-signal combining step The above-described aspect may include a reduced-image generating step of reducing the input image signal by a predetermined ratio; and a correction-signal expanding step of expanding the second flicker correction signal by the predetermined ratio, wherein, in the flicker detecting step, the first flicker correction signal is generated on the basis of the input signal that has been reduced in the reduced-image generating step, and, in the flicker correcting step, flicker is corrected on the basis of the second flicker correction signal expanded in the correction-signal expanding step.

REFERENCE SIGNS LIST 1 image-processing device
2 flicker detecting portion
4 flicker correcting portion
10 flicker-correction-signal storing portion
11 phase-displacement detecting portion
12 phase-displacement correcting portion
13 low-pass filter (correction-signal combining portion)
14 reduced-image generating portion
15 flicker-correction-signal expanding interpolating portion (correction-signal expanding portion.)
S1 flicker detecting step
S2 flicker-correction-signal storing step
S3 phase-displacement detecting step
S4 phase-displacement correcting step
S5 correction-signal combining step
S6 flicker correcting step

The invention claimed is:

1. An image-processing device comprising:
a flicker detecting portion that detects a flicker component in an input image signal for each frame and that generates a first flicker correction signal;
a flicker-correction-signal storing portion that stores the first flicker correction signal generated by the flicker detecting portion for a plurality of latest continuous frames;
a phase-displacement detecting portion that, when the most-recent first flicker correction signal is detected by the flicker detecting portion, selects the past first flicker correction signal having substantially the same phase as the most-recent first flicker correction signal from the past first flicker correction signals stored in the flicker-correction-signal storing portion, and that detects a phase displacement level with respect to the most-recent first flicker correction signal;
a phase-displacement correcting portion that corrects the phase displacement of the selected past first flicker correction signal on the basis of the phase displacement level detected by the phase-displacement detecting portion;
an infinite-impulse-response correction-signal combining portion that generates a second flicker correction signal by combining, at a predetermined ratio, the past first flicker correction signal, in which the phase displacement thereof has been corrected by the phase-displacement correcting portion, and the most-recent first flicker correction signal; and
a flicker correcting portion that corrects the input image signal on the basis of the second flicker correction signal generated by the correction-signal combining portion.

2. An image-processing device according to claim 1, wherein the phase-displacement detecting portion selects the past first flicker correction signal for a number of frames that matches a flicker occurrence cycle determined on the basis of a power-supply frequency in the surrounding environment when acquiring the input image signal and an image-acquisition frame rate at which the input image signal is acquired.

3. An image-processing device according to claim 1, fu comprising:
a reduced-image generating portion that inputs the input image signal to the flicker detecting portion after reducing the input image signal by a predetermined ratio; and
a correction-signal expanding portion that inputs the second flicker correction signal to the flicker correcting portion after expanding the second flicker correction signal by the predetermined ratio.

4. An image-processing device according to claim 1, wherein the phase-displacement detecting portion detects a phase displacement by subjecting the two first flicker correction signals to pattern matching.

5. An image-processing method comprising:
a flicker detecting step of detecting a flicker component in an input image signal for each frame and of generating a first flicker correction signal;
a flicker-correction-signal storing step of storing the first flicker correction signal generated in the flicker detecting step for a plurality of latest continuous frames;
a phase-displacement detecting step of, when the most-recent first flicker correction signal is detected in the flicker detecting step, selecting the past first flicker correction signal having substantially the same phase as the most-recent first flicker correction signal from the past first flicker correction signals stored in the flicker-correction-signal storing step, and of detecting a phase displacement level with respect to the most-recent first flicker correction signal;
a phase-displacement correcting step of correcting the phase displacement of the selected past first flicker correction signal on the basis of the phase displacement level detected in the phase-displacement detecting step;
a correction-signal combining step of generating a second flicker correction signal by combining, at a predetermined ratio, the past first flicker correction signal, in which the phase displacement thereof has been corrected in the phase-displacement correcting step, and the most-recent first flicker correction signal; and a flicker correcting step of correcting flicker in the input image signal on the basis of the second flicker correction signal generated in the correction-signal combining step.

6. An image-processing method according to claim 5, further comprising:
a reduced-image generating step of reducing the input image signal by a predetermined ratio; and
a correction-signal expanding step of expanding the second flicker correction signal by the predetermined ratio,
wherein, in the flicker detecting step, the first flicker correction signal is generated on the basis of the input image signal that has been reduced in the reduced-image generating step, and,
in the flicker correcting step, flicker is corrected on the basis of the second flicker correction signal expanded in the correction-signal expanding step.

* * * * *